United States Patent
Saito et al.

(10) Patent No.: US 9,254,475 B2
(45) Date of Patent: Feb. 9, 2016

(54) EXHAUST GAS PURIFICATION CATALYST

(71) Applicants: Yoshinori Saito, Toyota (JP); Yuki Aoki, Nisshin (JP); Toshitaka Tanabe, Nagakute (JP); Miho Hatanaka, Nagakute (JP); Naoki Takahashi, Nagoya (JP); Akira Morikawa, Nagoya (JP)

(72) Inventors: Yoshinori Saito, Toyota (JP); Yuki Aoki, Nisshin (JP); Toshitaka Tanabe, Nagakute (JP); Miho Hatanaka, Nagakute (JP); Naoki Takahashi, Nagoya (JP); Akira Morikawa, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/381,841

(22) PCT Filed: Feb. 27, 2013

(86) PCT No.: PCT/IB2013/000339
§ 371 (c)(1),
(2) Date: Aug. 28, 2014

(87) PCT Pub. No.: WO2013/140216
PCT Pub. Date: Sep. 26, 2013

(65) Prior Publication Data
US 2015/0045212 A1 Feb. 12, 2015

(30) Foreign Application Priority Data
Mar. 21, 2012 (JP) .................................. 2012-063774

(51) Int. Cl.
B01J 23/00 (2006.01)
B01J 23/02 (2006.01)
(Continued)

(52) U.S. Cl.
CPC ................ *B01J 23/10* (2013.01); *B01D 53/945* (2013.01); *B01J 21/066* (2013.01); *B01J 23/63* (2013.01);
(Continued)

(58) Field of Classification Search
CPC ............ B01J 23/00; B01J 23/02; B01J 23/10; B01J 23/38–23/46; B01J 23/54; B01J 23/58; B01J 23/63; B01J 21/04; B01J 21/066
USPC ........... 502/302–304, 327, 28, 332–334, 339, 502/349, 355, 439
See application file for complete search history.

(56) References Cited

U.S. PATENT DOCUMENTS 5,801,114 A * 9/1998 Durand .............. B01D 53/9418
423/213.5

(Continued)

FOREIGN PATENT DOCUMENTS

| CN | 101842321 A | 9/2010 |
|---|---|---|
| JP | 2006 36556 | 2/2006 |

(Continued)

OTHER PUBLICATIONS

International Search Report Issued Jul. 8, 2013 in PCT/IB13/000339 Filed Feb. 27, 2013.

*Primary Examiner* — Cam N. Nguyen
(74) *Attorney, Agent, or Firm* — Oblon, McClelland, Maier & Neustadt, L.L.P.

(57) ABSTRACT

An exhaust gas purification catalyst includes a composite oxide support, and a precious metal catalyst supported on the composite oxide support. The composite oxide support includes alumina, zirconia, ceria, a first additive element oxide and a second additive element oxide. The first additive element oxide contains an additive element selected from the group consisting of rare earth elements excluding cerium and alkali earth elements. The second additive element oxide contains an additive element selected from the group consisting of rare earth elements excluding cerium and alkali earth elements. In the composite oxide support, alumina is contained in a range of 30 to 40% by mass and zirconia is contained in a range of 36 to 46% by mass.

6 Claims, 2 Drawing Sheets

(51) Int. Cl.

| | |
|---|---|
| *B01J 23/08* | (2006.01) |
| *B01J 23/10* | (2006.01) |
| *B01J 23/40* | (2006.01) |
| *B01J 23/42* | (2006.01) |
| *B01J 23/44* | (2006.01) |
| *B01J 23/56* | (2006.01) |
| *B01J 23/58* | (2006.01) |
| *B01D 53/94* | (2006.01) |
| *B01J 37/03* | (2006.01) |
| *B01J 21/06* | (2006.01) |
| *B01J 23/63* | (2006.01) |
| *B01J 37/00* | (2006.01) |
| *B01J 37/02* | (2006.01) |

(52) U.S. Cl.
CPC .......... *B01J 37/0036* (2013.01); *B01J 37/0201* (2013.01); *B01J 37/031* (2013.01); *B01D 2255/102* (2013.01); *B01D 2255/1021* (2013.01); *B01D 2255/1023* (2013.01); *B01D 2255/1025* (2013.01); *B01D 2255/204* (2013.01); *B01D 2255/206* (2013.01); *B01D 2255/2042* (2013.01); *B01D 2255/2045* (2013.01); *B01D 2255/2047* (2013.01); *B01D 2255/2061* (2013.01); *B01D 2255/2063* (2013.01); *B01D 2255/2065* (2013.01); *B01D 2255/2068* (2013.01); *B01D 2255/2092* (2013.01); *B01D 2255/20715* (2013.01); *B01D 2255/908* (2013.01); *Y02T 10/22* (2013.01)

(56) References Cited

U.S. PATENT DOCUMENTS

| | | | | |
|---|---|---|---|---|
| 5,895,772 | A * | 4/1999 | Grigorova | B01D 53/945 502/304 |
| 6,083,868 | A * | 7/2000 | Yoshida | B01D 53/945 502/205 |
| 6,150,288 | A * | 11/2000 | Suzuki et al. | 501/105 |
| 6,248,688 | B1 * | 6/2001 | Wu et al. | 502/302 |
| 6,306,794 | B1 * | 10/2001 | Suzuki et al. | 502/304 |
| 6,335,305 | B1 * | 1/2002 | Suzuki et al. | 502/325 |
| 6,620,762 | B2 * | 9/2003 | Tan et al. | 502/304 |
| 6,831,036 | B1 * | 12/2004 | Yamazaki | B01D 53/945 502/302 |
| 6,956,008 | B2 * | 10/2005 | Takeshima et al. | 502/326 |
| 7,407,911 | B2 * | 8/2008 | Yeo | 502/304 |
| 7,585,477 | B2 * | 9/2009 | Nakatsuji et al. | 423/213.2 |
| 7,871,452 | B2 * | 1/2011 | Yamada et al. | 55/523 |
| 7,923,407 | B2 * | 4/2011 | Goto | 502/327 |
| 8,043,992 | B2 * | 10/2011 | Hatanaka et al. | 502/327 |
| 8,067,330 | B2 * | 11/2011 | Suzuki et al. | 502/302 |
| 8,097,553 | B2 * | 1/2012 | Miura et al. | 502/304 |
| 8,105,561 | B2 * | 1/2012 | Hatanaka et al. | 423/213.5 |
| 8,133,839 | B2 * | 3/2012 | Matsueda et al. | 502/349 |
| 8,211,824 | B2 * | 7/2012 | Akamine et al. | 502/332 |
| 8,465,711 | B2 * | 6/2013 | Ikeda et al. | 423/213.5 |
| 8,530,372 | B2 * | 9/2013 | Luo et al. | 502/303 |
| 8,546,296 | B2 * | 10/2013 | Yabuzaki et al. | 502/332 |
| 8,673,809 | B2 * | 3/2014 | Nakatsuji et al. | 502/327 |
| 8,680,004 | B2 * | 3/2014 | Kitamura | B01D 53/945 502/302 |
| 8,683,787 | B2 * | 4/2014 | Nakagawa et al. | 60/299 |
| 8,697,600 | B2 * | 4/2014 | Nobukawa et al. | 502/327 |
| 8,741,799 | B2 * | 6/2014 | Matsueda et al. | 502/170 |
| 8,771,624 | B2 * | 7/2014 | Ikeda et al. | 423/213.5 |
| 8,795,619 | B2 * | 8/2014 | Suzuki et al. | 423/230 |
| 8,852,519 | B2 * | 10/2014 | Watanabe et al. | 422/180 |
| 8,975,204 | B2 * | 3/2015 | Hori et al. | 502/304 |
| 8,999,252 | B2 * | 4/2015 | Cho et al. | 422/180 |
| 2007/0104950 | A1 | 5/2007 | Morikawa et al. | |
| 2007/0215009 | A1 | 9/2007 | Shimazu et al. | |
| 2008/0038172 | A1 | 2/2008 | Chen et al. | |
| 2009/0099013 | A1 | 4/2009 | Morikawa et al. | |
| 2010/0227757 | A1 | 9/2010 | Hatanaka et al. | |

FOREIGN PATENT DOCUMENTS

| | | |
|---|---|---|
| JP | 2007 331991 | 12/2007 |
| JP | 2009 107901 | 5/2009 |

\* cited by examiner

EXHAUST GAS PURIFICATION CATALYST

BACKGROUND OF THE INVENTION

1. Field of the Invention

The invention relates to an exhaust gas purification catalyst including a composite oxide support and a precious metal catalyst supported on a surface thereof.

2. Description of Related Art

In various kinds of industrial fields, various efforts for reducing an environmental impact are being forwarded worldwide. In particular, in an automobile industry, a development for popularization and further performance improvement of not only gasoline engine cars excellent in the fuel consumption performance but also of so-called ecologically-friendly cars such as hybrid cars and electric cars is being advanced daily. In addition to the development of such the ecologically-friendly cars, a study on exhaust gas purification catalysts for purifying an exhaust gas discharged from an engine has been actively forwarded. The exhaust gas purification catalyst includes an oxide catalyst, a ternary catalyst, and a NOx storage and reduction catalyst. In the exhaust gas purification catalyst, a catalyst of a precious metal such as platinum, rhodium, or palladium develops catalyst activity. The precious metal catalyst is generally used in a state supported on a support composed of porous oxide such as alumina.

The exhaust gas purification catalyst is generally used under a high temperature atmosphere. Accordingly, it is desirable that a catalyst has high heat resistance that allows to maintain high catalyst activity even after long term use under a high temperature atmosphere.

Now, in Japanese Patent Application Publication No. 2009-107901 (JP 2009-107901 A), a particulate inorganic mixed oxide that contains aluminum, zirconium, cerium and first and second additive elements is disclosed. The first and second additive elements are selected from the group consisting of rare earth elements excluding cerium and alkali earth elements. More specifically, the inorganic mixed oxide is composed as shown below. A rate of content of aluminum in the inorganic mixed oxide is 60 to 90% by atom as an element with respect to a total amount of elements that become a positive ion in the inorganic mixed oxide; a rate of content of cerium in the inorganic mixed oxide is 0.4 to 50% by atom as an element with respect to a total amount of zirconium and cerium in the inorganic mixed oxide; a rate of content of a total amount of the first and second additive elements is 1 to 12% by atom as elements with respect to a total amount of elements that become positive ions in the inorganic mixed oxide; 80% or more of primary particles of the inorganic mixed oxide has a particle size of 100 nm or less; and in at least a part of superficial portion of the primary particles, a surface concentration region where a rate of content of the second additive element is locally enhanced is formed. Preferably, the first additive element is lanthanum and the second additive element is neodymium.

An inorganic mixed oxide where neodymium oxide is concentrated on a surface of oxides of aluminum, zirconium and cerium, that is, alumina, zirconia and ceria is a raw material excellent in the heat resistance. Further, the inorganic mixed oxide exerts oxygen storage capacity (OSC capacity), HC modification capacity and NOx purification performance with good balance.

SUMMARY OF THE INVENTION

The invention provides an exhaust gas purification catalyst that has high heat resistance, excellent oxygen storage capacity, HC modification capacity and NOx purification capacity, further high oxygen release capacity and endurance, and high pressure loss reduction effect as a catalyst.

An exhaust gas purification catalyst according to an aspect of the invention includes a composite oxide support, and a precious metal catalyst supported on the composite oxide support. The composite oxide support includes alumina ($Al_2O_3$), zirconia ($ZrO_2$) and ceria ($CeO_2$), a first additive element oxide and a second additive element oxide. The first additive element oxide contains an additive element selected from the group consisting of rare earth elements excluding cerium (Ce) and alkali earth elements. The second additive element oxide contains an additive element selected from the group consisting of rare earth elements excluding cerium and alkali earth elements. In the composite oxide support, alumina is contained in a range of 30 to 40% by mass and zirconia is contained in a range of 36 to 46% by mass.

By setting the range of the rate of content of alumina to 30 to 40% by mass, when an exhaust gas catalyst is formed into a catalyst body having a definite dimension and shape, a material volume of the exhaust gas purification catalyst that is a constituent element thereof can be reduced. Accordingly, the pressure loss of the catalyst body can be reduced. Also, the oxygen storage capacity and HC modification capacity, and the NOx purification performance can be sufficiently exerted with good balance.

Further, in accordance with that a rate of content of alumina is set to a range such low as 30 to 40% by mass, a rate of content of zirconia can be set to a relatively high range such as 36 to 46% by mass. By setting the range of the rate of content of zirconia like this, an exhaust gas purification catalyst having, other than high oxygen storage capacity, high oxygen release capacity can be obtained.

As described above, the exhaust gas purification catalyst of the aspect of the invention has high heat resistance, excellent oxygen storage capacity and HC modification capacity and NOx purification capacity. Further, as the exhaust gas purification catalyst of the aspect of the invention, an exhaust gas purification catalyst that has high oxygen release capacity and endurance, and has, as a catalyst, a high pressure loss reduction effect can be obtained.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
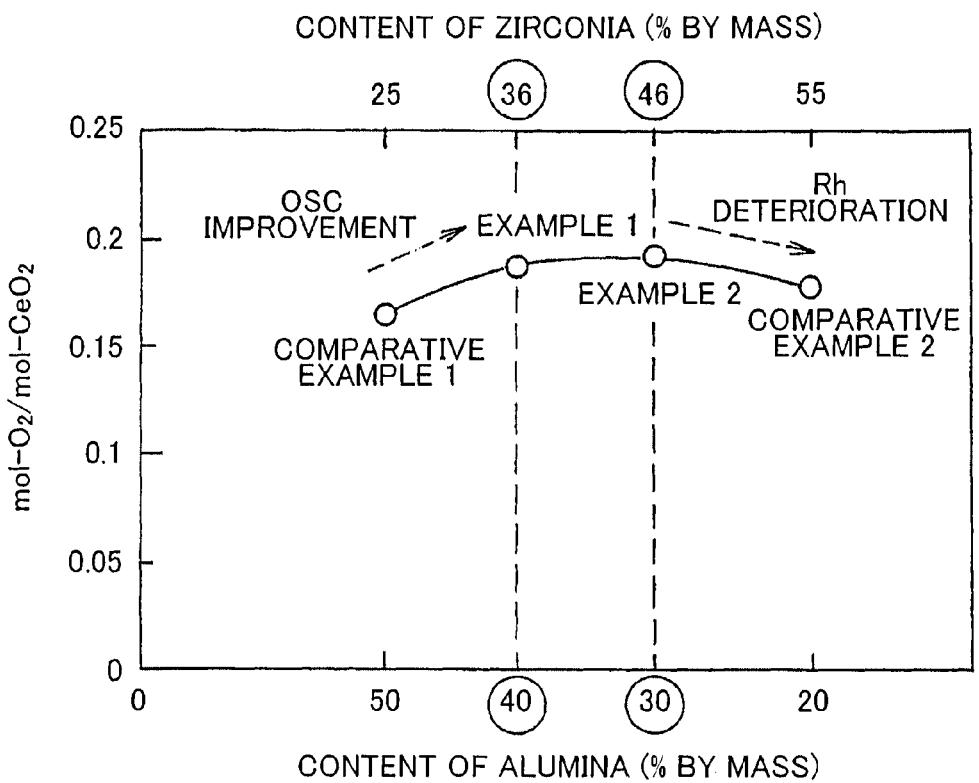
FIG. 1 is a diagram showing results of experiments that verified the oxygen storage capacity (OSC capacity) and the oxygen release capacity of each of exhaust gas purification catalysts (Examples 1 and 2, Comparative Examples 1 and 2) when contents of alumina and zirconia were changed.

Hereinafter, an embodiment of an exhaust gas purification catalyst of the invention will be described with reference to accompanying drawings. The exhaust gas purification catalyst of the embodiment of the invention includes a composite oxide support and a precious metal catalyst supported on the composite oxide support. The composite oxide support includes alumina, zirconia, ceria, a first additive element oxide and a second additive element oxide. The first additive element oxide contains an additive element selected from the group consisting of rare earth elements excluding cerium and alkali earth elements. Also, the second additive element oxide contains an additive element selected from the group consisting of rare earth elements excluding cerium and alkali earth elements. That is, each of the above elements is yttrium (Y), lanthanum (La) and neodymium (Nd), and so on. The additive element contained in the first additive element oxide may be different from the additive element included in the second additive element oxide. In other words, the combination of the first additive element oxide and the second additive element oxide may contain two kinds of additive elements. Then, oxides of the two kinds of additive elements may be constituent elements of the composite oxide support.

In the composite oxide support, alumina and zirconia are respectively contained in the range of 30 to 40% by mass and 36 to 46% by mass. Here, the alumina may be amorphous alumina such as activated alumina, or crystalline alumina. Further, on at least a part of a superficial layer (of respective primary particles, or secondary particles in which the primary particles are flocculated) of alumina, zirconia and ceria, a surface concentration region where a rate of content of the second additive element oxide is high is formed.

A range of each of rates of content of alumina and zirconia is a range where both oxygen storage capacity and deterioration preventive capacity of a supported precious metal catalyst are efficient. The range of each of rates of content is based on results verified. For example, in the range where a content of alumina is less than 30% by mass, an area for supporting the precious metal catalyst reduces. As a result, the deterioration of the precious metal catalyst after endurance test increases.

Here, two additive elements selected from the group consisting of rare earth elements and alkali earth elements are two elements selected from the group consisting of yttrium (Y), lanthanum (La), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), lutetium (Lu), magnesium (Mg), calcium (Ca), strontium (Sr), barium (Ba) and radium (Rd). Hereinafter, the additive element contained in the first additive element oxide may be referred as a first additive element. Furthermore, the additive element contained in the second additive element oxide may be referred as a second additive element.

Further, as a precious metal catalyst supported on a surface of the composite oxide support, for example, platinum (Pt), palladium (Pd) and rhodium (Rh) may be used singularly or in a combination thereof. When rhodium is used as a precious metal catalyst, a bond represented by Rh—O-M (M represents the second additive element) may be formed on a surface of the composite oxide support to stabilize Rh. In this case, as the second additive element, it is preferable to use Y, La, Pr, Nd, Yb, Mg, Ca or Ba. Among those, Nd is more preferable.

The first additive element is an element for stabilizing a structure. The second additive element is an element for surface concentration. As a combination of the first additive element and the second additive element, the same element may be used. Alternatively, as a component composition of a preferable composite oxide support, La may be used as the first additive element (structure stabilization element) and Nd may be used as the second additive element (surface concentrating element). That is, lanthanum oxide may be bonded to alumina, zirconia and ceria, and then, on at least a part of a surface of each of alumina, zirconia and ceria, a neodymium oxide may form a high concentration region thereof to constitute a composite oxide support. Thus, an exhaust gas purification catalyst where rhodium is supported on the composite oxide support may be formed.

As a specific component composition of the exhaust gas purification catalyst, a rate of content of alumina may be defined in the range of 30 to 40% by mass and a rate of content of zirconia may be defined in the range of 36 to 46% by mass. Further, ceria may be contained by 20% by mass, and each of lanthanum oxide and neodymium oxide may be contained by 2% by mass. Here, lanthanum oxide and neodymium oxide may be respectively regarded as the first additive element oxide and the second additive element oxide. Then, rates of content of alumina and zirconia may be adjusted in the ranges so that a sum total of rates of content of all compositions may be 100% by mass. Then, an exhaust gas purification catalyst where rhodium is supported on such fabricated composite oxide support may be used.

According to verification, it is confirmed that a performance of an exhaust gas purification catalyst fabricated as follows is sufficient: a rate of content of alumina is defined in the range of 30 to 40% by mass; a rate of content of zirconia is defined in the range of 36 to 46% by mass; ceria is contained by 20% by mass; and a sum total of rates of content of alumina, zirconia and ceria is less than 100% by mass. According to the embodiment of the invention, as described above, each of lanthanum oxide and neodymium oxide is contained by 2% by mass.

A range of the rate of content of alumina of the embodiment of the invention is less than that of a composite oxide support disclosed in JP 2009-107901 A. Specifically, in JP 2009-107901A, it is disclosed that a mass ratio of alumina (here, aluminum oxide) is set to at least more than a half of the entire mass ratio. In the embodiment of the invention, by setting the range of the rate of content of alumina to 30 to 40% by mass, a material bulk of the exhaust gas purification catalyst as a constituent element thereof can be reduced when the exhaust gas purification catalyst is formed into a catalyst having definite dimension and shape. As a result thereof, the pressure loss of a catalyst body can be reduced. Further, oxygen storage capacity, HC modification capacity and NOx purification capacity can be exerted with good balance. Further, in accordance to that the rate of content of alumina is defined to such a low range as 30 to 40% by mass, the rate of content of zirconia can be set to a relatively high range such as 36 to 46% by mass. By setting the range of the rate of content of zirconia like this, an exhaust gas purification catalyst having, other than high oxygen storage capacity, high oxygen release capacity can be obtained.

An Example of an exhaust gas purification catalyst may include a composite oxide support where: lanthanum oxide is bonded to each of alumina, zirconia and ceria; at least a part of a surface of each of alumina, zirconia and ceria is covered with a region where neodymium oxide is concentrated to form a composite oxide; yttrium oxide is bonded in the range of 9% by mass or less to the above composite oxide; and a sum total of each of the rates of content of alumina, zirconia, ceria, lanthanum oxide, neodymium oxide and yttrium oxide is defined as 100% by mass in the composite oxide support. A range where yttrium oxide is contained less than 9% by mass means a range where yttrium oxide is contained more than 0% by mass and 9% by mass or less.

As to alumina and zirconia having a definite width in the rate of content thereof, with an exhaust gas purification catalyst that contains alumina by 30% by mass as a reference, a rate of content of yttrium oxide was gradually increased to fabricate a plurality of exhaust gas purification catalysts, and the oxygen storage capacity of each thereof was measured (detailed below). According to the verification based on the measurements, in an exhaust gas purification catalyst containing yttrium oxide in the range of 9% by mass or less, the endurance of the catalyst is improved and phase separation of zirconia and ceria can be suppressed. As a result, it is verified that when yttrium oxide is contained 9% by mass or less, the oxygen storage capacity is improved compared with the case where yttrium oxide is not contained.

It is identified that when the content of yttrium oxide exceeds 10% by mass, a precious metal catalyst is deactivated to be deteriorated in the catalyst performance.

As to the content of yttrium oxide, exhaust gas purification catalysts are fabricated respectively by varying the content of yttrium oxide, and these are subjected to XRD measurement after RL endurance test (detailed below). The RL endurance test is a test where, in an atmosphere where a rich gas and a lean gas are alternately repeated in a period of several minutes, a sample is held under a temperature atmosphere of about 1000° C. for several hours.

As described above, in an exhaust gas purification catalyst that does not contain yttrium oxide, it is identified that separate phases of zirconia and ceria is caused. On the contrary, in an exhaust gas purification catalyst that contains yttrium oxide in the range of 9% by mass or less, it is identified that the endurance of the catalyst is improved and zirconia and ceria are suppressed from forming separate phases.

Hereinafter, a method for manufacturing an exhaust gas purification catalyst will be described. Firstly, a coprecipitate containing aluminum, zirconium, cerium and a first additive element is generated and the resulted coprecipitate is fired. The firing is performed under an oxidizing atmosphere such as an air atmosphere, at a temperature of about 600 to 1200° C. for about 1 to 10 hrs. After obtaining a mixture of oxides of the respective elements, the resulted mixture of oxides is, with the second additive element attached thereto, fired to generate a composite oxide support to which the second additive element oxide is further bonded. As a solution for obtaining the coprecipitate like this, a solution obtained by dissolving salts of aluminum, zirconium, cerium, and the first additive element in water or alcohol may be used. Examples of such the salts include a sulphate, a nitrate, a chloride, and an acetate.

Then, for example, the solution for obtaining the coprecipitate is mixed with an alkaline solution to control pH of the solution to a range where hydroxides of the respective metal elements precipitate. Thus, a coprecipitate as a precursor of the mixture of oxides is generated. Here, as the alkaline solution, from the viewpoint of capable of readily volatilizing to remove during firing, a solution of ammonia or ammonium carbonate is preferred.

According to the manufacturing method, the (oxide of) first additive element is present in a state dissolved and dispersed in only alumina. Alternatively, the oxide of the first additive element is present in a state dissolved and dispersed in all of alumina, zirconia and ceria.

Next, the second additive element is attached to a mixed oxide composed of alumina, zirconia, ceria and the first additive element oxide. For example, the mixed oxide is suspended in a solution where a salt (nitrate or the like) of the second additive element is dissolved to allow the mixed oxide to support the second additive element. By further firing, a particulate composite oxide support is obtained. According to such the method, a majority of attached second additive element oxide is made to exist in a superficial layer of alumina, zirconia or ceria. According to the manufacturing method, a composite oxide support having a concentration region where a rate of content of the second additive element oxide is high is obtained. Here, the concentration region where a rate of content of the second additive element oxide is high means a region where the second additive element oxide is locally attached to the first additive element oxide.

On an entirety or a part of a surface of a primary particle of each of alumina, zirconia and ceria, the second additive element oxide is coated. Alternatively, the second additive element oxide is coated on an entirety or a part of a surface of a secondary particle constituted by flocculated alumina, flocculated zirconia or flocculated ceria. As a result thereof, on a surface of the primary particle or a surface of the secondary particle, a concentration region where the rate of content of the second additive element oxide is high is formed. A degree of the surface concentration of the second additive element oxide can be detected according to a method where the surface is dissolved and measured by ICP (inductively-coupled plasma) or a method where a surface is measured by XPS (X-ray Photoelectron Spectroscopy). In the specification, for example, when an XPS measurement of a surface is high with respect to a use amount (charge amount) of neodymium, it is called that the surface is concentrated (high concentration region is formed).

The resulted composite oxide support is added into an aqueous solution of nitrate of rhodium and stirred, and water is evaporated. After water is evaporated and a residual solid material is dried, by further heating at about 500° C. for several hours, an exhaust gas purification catalyst where rhodium is supported on a composite oxide support is obtained.

Hereinafter, experiments by which oxygen storage capacity (OSC capacity) and oxygen release capacity, endurance, bulk density and pressure loss of the exhaust gas purification catalysts are identified and results thereof are shown. Test materials of the exhaust gas purification catalysts of Examples and Comparative Examples were fabricated according to the following method. Then, the oxygen storage capacity (OSC capacity), oxygen release capacity, endurance, bulk density and pressure loss of each of the test materials were identified. Further, based on the results of identification, an optimum range of each of the contents of alumina and zirconia constituting the composite oxide support and an optimum range of content of yttrium oxide were defined.

In Table 1 shown below, compositions of Examples and Comparative Examples are shown, and based on the compositions shown in Table 1, respective test materials of Examples and Comparative Examples are fabricated. In Table 1, Nd of the surface concentration region is measured by XPS (X-ray photoelectron spectroscopy).

TABLE 1

|  |  | Comparative Example 1 | Comparative Example 2 | Example 1 | Example 2 | Example 3 | Example 4 | Example 5 | Comparative Example 3 |
|---|---|---|---|---|---|---|---|---|---|
| Composition Ratio (% by mass) | $Al_2O_3$ | 50 | 20 | 40 | 30 | 30 | 30 | 30 | 30 |
|  | $ZrO_2$ | 26 | 56 | 36 | 46 | 44 | 42 | 38 | 36 |
|  | $CeO_2$ | 20 | 20 | 20 | 20 | 20 | 20 | 20 | 20 |
|  | $Nd_2O_3$ | 2 | 2 | 2 | 2 | 2 | 2 | 2 | 2 |
|  | $La_2O_3$ | 2 | 2 | 2 | 2 | 2 | 2 | 2 | 2 |
|  | $Y_2O_3$ | 0 | 0 | 0 | 0 | 2 | 4 | 8 | 10 |
| Atomic Ratio of Nd/Ce |  | 0.1 | 0.1 | 0.1 | 0.1 | 0.1 | 0.1 | 0.1 | 0.1 |
| Nd in Surface Concentration Region |  | 0.22 | 0.2 | 0.2 | 0.2 | 0.2 | 0.2 | 0.2 | 0.2 |

Hereinafter, a method for fabricating a test material of exhaust gas purification catalyst will be shown. In both of Examples and Comparative Examples, each of exhaust gas purification catalyst supports was fabricated so as to have a rate of content shown in the Table 1. Specifically, after aluminum nitrate nonahydrate was dissolved in ion-exchanged water, each of zirconium oxynitrate dihydrate, cerium nitrate hexahydrate, lanthanum nitrate hexahydrate and yttrium nitrate hexahydrate was mixed so as to be a predetermined value. Then, hydrogen peroxide water of a mol amount 1.2 times a mol amount of cerium in cerium nitrate was added and stirred to obtain a raw solution. Further, the raw solution was added under stirring in an aqueous solution of $NH_3$ (an amount of 1.2 times a neutralization equivalent with respect to metal cations) to precipitate the respective components and an oxide precursor was obtained. The mixture was stirred under the condition that the pH is 9 or higher.

The resulted oxide precursor was, after subjecting to centrifugation enough to cleanse, dried for 7 hrs in air, under a temperature atmosphere of 150° C. The dried matter was calcined at 330° C. for 5 hrs to obtain a compact. After the compact was crushed with a crusher, the firing was conducted in air under a temperature atmosphere of 700° C. for 5 hrs. Further, by conducting the firing in air under a temperature atmosphere of 900° C. for 5 hrs, oxide was obtained.

The resulted oxide was suspended in an aqueous solution of neodymium nitrate and stirred for 3 hrs. Then, under further stirring, the suspension was overheated to evaporate water content, and a residual solid matter was heated in air under a temperature atmosphere of 110° C. for 40 hrs. After the heating, the firing was further conducted under a temperature atmosphere of 900° C. for 5 hrs, and particulate composite oxide supports related to the respective Examples and Comparative Examples were obtained.

Each of the composite oxide supports was added in an aqueous solution of rhodium nitrate and stirred, and, under further stirring, the solution was overheated to evaporate water content. After evaporation of water content, a residual solid matter was dried in air under a temperature atmosphere of 110° C. for 7 hrs. Then, the firing was conducted in air under a temperature atmosphere of 500° C. for 3 hrs and a rhodium catalyst was supported by 0.2% by mass with respect to the composite oxide support. As described above, each of test materials of exhaust gas purification catalysts according to Examples and Comparative Examples was fabricated.

Hereinafter, experimental conditions and measurement methods of various performances will be described. As to the measurement of bulk densities of test materials, a tapping method was used to measure.

The oxygen storage capacity (OSC capacity) was measured in such a manner that 2% CO and 1% $O_2$ were introduced in an interval of 2 mins, an amount of $CO_2$ generated after 30 secs of introduction of CO was measured, and based on the amount of generated $CO_2$, the oxygen storage capacity was calculated.

The endurance was measured according to the RL endurance test, and the RL endurance test was conducted in such a manner that each of 1% $CO/N_2$+10% $H_2O$ and 5% $O_2/N_2$+ 10% $H_2O$ was fed for 5 mins and the material was held under a temperature atmosphere of about 1000° C. for 5 hrs.

The pressure loss was measured as the pressure loss under 5 $m^3$/min. After coating a test material on an 875 cc ceramic honeycomb (φ103 mm×L105 mm, 600 cell/3 mil, manufactured by Denso Corporation), an experiment was conducted.

Figure 2:
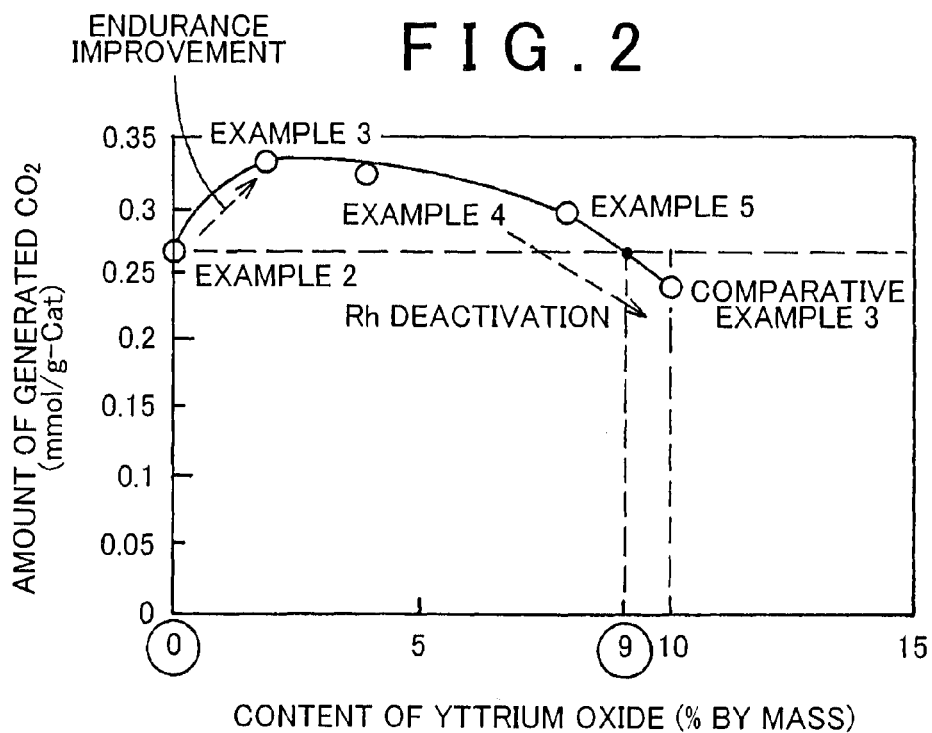
FIG. 2 is a diagram showing results of experiments that verified the endurance of each of exhaust gas purification catalysts (Examples 2 to 5, Comparative Example 3) when a content of yttrium oxide was changed.
Figure 3:
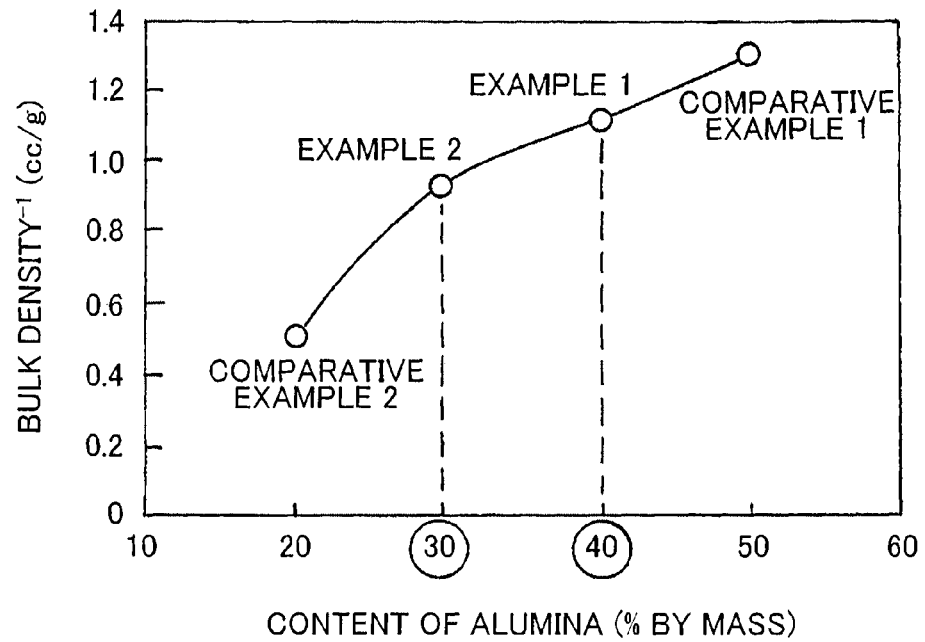
FIG. 3 is a diagram showing results of experiments that identified a bulk density of each of exhaust gas purification catalysts (Examples 1 and 2, Comparative Examples 1 and 2) when a content of alumina was changed.
Figure 4:
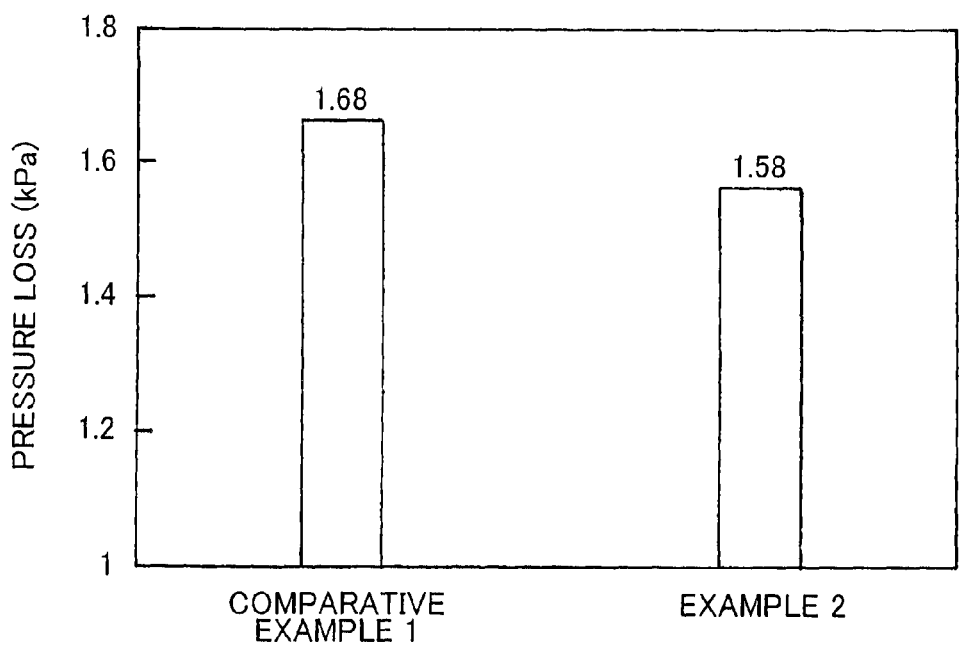
FIG. 4 is a diagram showing results of experiments that measured pressure loss of each of Example 2 and Comparative Example 1.

Hereinafter, results of various kinds of measurements will be described. Results of measurements are shown in lower two columns of Table 1 and FIGS. 1 to 4. FIG. 1 is a diagram showing results of experiments that verified the oxygen storage capacity (OSC capacity) and oxygen release capacity of exhaust gas purification catalysts (Examples 1 and 2, Comparative Examples 1 and 2) when contents of alumina and zirconia were varied. FIG. 2 is a diagram showing results of experiments that verified the endurance of exhaust gas purification catalysts (Examples 2 to 5, Comparative Example 3) when a content of yttrium oxide was varied. FIG. 3 is a diagram showing results of experiments that identified the bulk density of exhaust gas purification catalysts (Examples 1 and 2, Comparative Examples 1 and 2) when a content of alumina was varied. FIG. 4 is a diagram showing results of experiments that measured the pressure losses of Example 2 and Comparative Example 1.

Firstly, from results of XPS measurement of lower two columns of Table 1, it can be confirmed that a concentration of neodymium measured on a surface of a test material is high with respect to an added amount of neodymium. Therefore, it can be confirmed that a concentration region of neodymium oxide is formed on a surface of the test material.

Further, from FIG. 1, according to results of experiment that verified the oxygen storage capacity (OSC capacity) of four test materials of Comparative Example 1, Examples 1 and 2, and Comparative Example 2, the OSC capacities of Examples 1 and 2 are high and saturated therein. Further, the OSC capacities of Examples 1 and 2 are improved compared with the OSC capacity of Comparative Example 1. On the other hand, in Comparative Example 2, it is shown that Rh tends to deteriorate.

From the results of experiments, it is verified that it is better to fabricate a composite oxide support that is a constituent element of an exhaust gas purification catalyst in the range of 30 to 40% by mass of alumina and in the range of 36 to 46% by mass of zirconia.

Further, in FIG. 2 showing results of experiments related to the endurance, an amount of $CO_2$ generated in Example 2 where $Y_2O_3$ is not contained is defined as a threshold value. Results of measurements of amounts of generated $CO_2$ of Examples 3 to 5 and Comparative Example 3 are shown in FIG. 2.

From the same drawing, it is found that, while the endurance is improved in Example 3 than in Example 2, a Rh catalyst was deactivated as the content of $Y_2O_3$ increases toward Examples 4 and 5. Then, an amount of generated $CO_2$ of Comparative Example 3 is lower than a threshold value line.

A content of $Y_2O_3$ at an intersection of an approximate curve based on plot points of the respective test materials and a threshold value line is 9% by mass. Based on the tendency of a graph of the endurance, the content of $Y_2O_3$ can be defined in the range of 9% by mass or less.

Further, though omitted from showing in the drawing, from results of XRD measurement of respective test materials after RL endurance test, it is identified that in a material that does not contain $Y_2O_3$, separate phases of zirconia and ceria are generated. On the other hand, in a test material that contains $Y_2O_3$ in the range of 9% by mass or less, it is identified that the endurance of catalyst is improved, and zirconia and ceria are suppressed from generating separate phases.

Further, from FIG. 3, it is identified that as the content of alumina decreases, the bulk of material decreases.

By considering this, from results of measurement of pressure loss in FIG. 4, it is identified that the pressure loss of Example 2 is decreased by about 6% compared with that of Comparative Example 1. Accordingly, also from the viewpoint of the pressure loss, it is verified that it is better to fabricate an exhaust gas purification catalyst in the range of 30 to 40% by mass of alumina.

When an exhaust gas purification catalyst includes a composite oxide support that: contains at least alumina, zirconia and ceria; and has a concentration region where a rate of content of the second additive element oxide is high in at least a part of a superficial layer thereof, an exhaust gas purification catalyst where HC modification performance and NOx purification performance are sufficient can be obtained. Here, the second additive element oxide, for example, may be neodymium oxide, and the above superficial layer is a superficial layer of each of primary particles or a superficial layer of flocculated secondary particle. In addition to the above, from the results of experiment described above, it was verified that, when the composite oxide support that constitutes an exhaust gas purification catalyst contains alumina in the range of 30 to 40% by mass and zirconia in the range of 36 to 46% by mass, an exhaust gas purification catalyst is efficient in the oxygen storage capacity (OSC capacity), oxygen release capacity and the pressure loss reduction effect. Further, when an exhaust gas purification catalyst contains yttrium oxide in the range of 9% by mass or less, an exhaust gas purification catalyst further improved in the endurance can be obtained.

Further, in the aspect of the invention, in at least a part of a superficial layer of each of alumina, zirconia and ceria, a concentration region where a rate of content of the second additive element oxide is high may be formed.

Further, in the aspect of the invention, the additive element contained in the first additive element oxide may be different from the additive element contained in the second additive element oxide.

Further, in the aspect of the invention, the additive element contained in the first additive element oxide may be same as the additive element contained in the second additive element oxide.

According to the aspect of the invention, ceria may be contained by 20% by mass in the composite oxide support. Furthermore, a rate of content of alumina and a rate of content of zirconia may be defined so that a sum total of rates of content of alumina and zirconia is less than 100% by mass in the composite oxide support.

According to the aspect of the invention, the first additive element oxide may be lanthanum oxide and the second additive element oxide may be neodymium oxide.

According to the aspect of the invention, the composite oxide support may further contain yttrium oxide. More specifically, yttrium oxide may be contained in the range of 9% by mass or less. Furthermore, each of rates of content of alumina, zirconia, ceria, the first additive element oxide, the second additive element oxide and yttrium oxide may be defined so that a sum total of rates of content of alumina, zirconia, ceria, the first additive element oxide, the second additive element oxide and yttrium oxide is 100% by mass in the composite oxide support.

In the above, embodiments of the invention were described in detail with reference to drawings. However, a specific configuration is not limited to the embodiments. Design modifications within the range that does not deviate from a gist of the invention are included in the invention.

The invention claimed is:

1. An exhaust gas purification catalyst comprising:
 a composite oxide support; and
 a precious metal catalyst supported on the composite oxide support;
 wherein
 the composite oxide support comprises:
 30 to 40% by mass alumina;
 36 to 46% by mass zirconia;
 20% by mass ceria;
 from greater than 0 to 9% by mass yttrium oxide;
 lanthanum oxide; and
 neodymium oxide;
 and wherein
 a sum of the mass %'s of the alumina, zirconia, ceria, yttrium oxide, lanthanum oxide and neodymium oxide is 100%.

2. The exhaust gas purification catalyst of claim 1 wherein the content of yttrium oxide is from 2 to 8% inclusive by mass.

3. The exhaust gas purification catalyst of claim 1 wherein the composite oxide support comprises primary particles, the lanthanum oxide is homogeneously dispersed in the primary particles and the neodymium oxide is on a surface of the primary particles.

4. The exhaust gas purification catalyst of claim 3 wherein the precious metal catalyst is rhodium (Rh).

5. The exhaust gas purification catalyst of claim 4 wherein the rhodium (Rh) is attached to the primary particle surface through a bond to the neodymium oxide.

6. The exhaust gas purification catalyst of claim 1 wherein the precious metal catalyst is at least one selected from the group consisting of platinum (Pt), palladium (Pd) and rhodium (Rh).

* * * * *